US011577543B2

(12) United States Patent
Ciaramitaro et al.

(10) Patent No.: US 11,577,543 B2
(45) Date of Patent: Feb. 14, 2023

(54) NON-COHESIVE DESIGNS FOR HEAT TRANSFER SHEETS AND METHODS FOR FORMING NON-COHESIVE DESIGNS

(71) Applicant: STAHLS' INC., Sterling Heights, MI (US)

(72) Inventors: Fred Ciaramitaro, Sterling Hieghts, MI (US); Brett Stahl, Sterling Heights, MI (US)

(73) Assignee: STAHLS' INC., St. Clair Shores, MI (US)

( * ) Notice: Subject to any disclaimer, the term of this patent is extended or adjusted under 35 U.S.C. 154(b) by 387 days.

(21) Appl. No.: 16/702,007

(22) Filed: Dec. 3, 2019

(65) Prior Publication Data

US 2021/0162799 A1 Jun. 3, 2021

(51) Int. Cl.
*B44C 1/17* (2006.01)
*B32B 7/12* (2006.01)
*B41M 5/025* (2006.01)
*B32B 37/12* (2006.01)

(52) U.S. Cl.
CPC .............. *B44C 1/1716* (2013.01); *B32B 7/12* (2013.01); *B41M 5/0256* (2013.01); *B32B 37/1207* (2013.01); *B32B 2310/0843* (2013.01)

(58) Field of Classification Search
CPC ............ B32B 2250/02; B32B 2250/24; B32B 2307/732; B32B 2310/0843; B32B 2437/00; B32B 2451/00; B32B 27/08; B32B 27/36; B32B 27/40; B32B 37/1207; B32B 3/14; B32B 7/12; B41M 5/025; B41M 5/0256; B41M 5/24; B44C 1/162; B44C 1/1712; B44C 1/1716

USPC ......................................................... 156/250
See application file for complete search history.

(56) References Cited

U.S. PATENT DOCUMENTS

| | | | | | |
|---|---|---|---|---|---|
| 4,987,006 | A | * | 1/1991 | Williams | H05K 3/046 427/98.5 |
| 5,256,506 | A | * | 10/1993 | Ellis | B41M 3/14 430/278.1 |
| 5,401,618 | A | * | 3/1995 | Chapman | B41M 5/465 503/227 |
| 6,537,720 | B1 | * | 3/2003 | Foley | G01D 15/10 503/227 |
| 2005/0045586 | A1 | * | 3/2005 | Ellin | G01D 5/34707 216/65 |
| 2007/0020530 | A1 | * | 1/2007 | Zientek | B42D 25/373 430/1 |

(Continued)

OTHER PUBLICATIONS

Search Report by EIC (Year: 2021).*

*Primary Examiner* — Sonya M Sengupta
(74) *Attorney, Agent, or Firm* — Harness, Dickey & Pierce PLC

(57) ABSTRACT

The present invention provide a multi-layered heat transfer sheet comprising a plurality of distinct pieces forming one or more consecutive patterns that form shapes or objects having discontinuous peripheries, as well as a method for producing and/or making said item. The method for forming the heat transfer decorations includes ablating one or more layers of a heat transfer sheet using a defocused laser to define at least one plurality of discrete pieces that together define a heat transfer decoration. A single pass of the defocused laser may ablate the one or more layers of the heat transfer sheet so as to define the discrete pieces.

18 Claims, 2 Drawing Sheets

(56) References Cited

U.S. PATENT DOCUMENTS

2008/0261028 A1* 10/2008 Regan .................... B41M 5/24
                                                          430/306
2018/0350271 A1* 12/2018 Schmitt .................... G09F 3/02

* cited by examiner

NON-COHESIVE DESIGNS FOR HEAT TRANSFER SHEETS AND METHODS FOR FORMING NON-COHESIVE DESIGNS

TECHNICAL FIELD OF THE INVENTION

The present invention concerns the field of the execution of prints on objects. More specifically, the present invention concerns the decoration of surfaces, for example of fabrics, clothing items, and/or accessories, using a transfer sheet, where the transfer sheet and surface are suited to be subjected to heat treatments. In greater detail, the present invention concerns a multi-layered item comprising a plurality of distinct pieces forming one or more consecutive patterns that form shapes or objects having discontinuous peripheries, as well as a method for producing and/or making said item.

BACKGROUND

This section provides background information related to the present disclosure which is not necessarily prior art.

Several techniques for decorating objects made of fabric in general, such as T-shirts, sweatshirts, hats, shoes, trousers, bags, or clothing items and/or similar accessories are known in the art. The known techniques for decorating fabrics include, for example, traditional printing techniques, according to which the desired decorations (e.g., words, images, or the like) are obtained through the direct application of suitable inks to the fabrics themselves, for example using stencil techniques. Other techniques developed more recently are equally known, according to which the desired images or decorations are not created directly on the fabrics, but rather on printing supports, commonly referred to as heat transfer sheets or films, and successively applied to the fabrics through the simultaneous application of heat and pressure to a combination of the support and fabric. These techniques are appreciated because printing on such supports is much easier than printing directly on fabric. As such, printing on supports means being able to obtain decorations of the most varied types and shapes.

Known printing supports include, for example, sublimation papers, polyester flocks, and polyester fabrics. In general, printing supports initially include a plurality of layers. For example, one or more finish or carrier layers that are suited to receive inks (such as sublimation inks), as well as one or more thermo-adhesive layers. In various aspects, the desired images or decorations may be disposed or printed on the finished layer. When the support is laid on the fabric in a desired position, the thermo-adhesive layer may be in contact with the fabric, and the desired images or decorations may be applied or fixed to the fabric through the application of heat and pressure (for example, temperatures exceeding 180° C. for more than 15 seconds and the use of a special press). The heat and pressure causes the thermo-adhesive layer to adhere to the fabric forming films or layers, often continuous, on the surface of the fabric containing the desired design or decoration. Such a printing process generally allows desired designs and decorations to be applied to fabrics or clothing items in a reliable manner and practically without any risk of undesired detachment. However, the continuous films or layers often have little flexibility and breathability, which decreases effectiveness of sweat wicking materials and may result in, for example, cracking of the design or decoration. Accordingly, it would be desirable to develop designs or decorations that improve the durability of the as-applied design or decorations, as well as related methods that improve the availability of the durable designs or decorations.

SUMMARY

This section provides a general summary of the disclosure, and is not a comprehensive disclosure of its full scope or all of its features.

In various aspects, the present disclosure provides a method for forming a heat transfer decoration. The method includes ablating a heat transfer sheet using a defocused laser to define at least one plurality of discrete pieces. Each discrete piece may be separated from adjacent discrete pieces by a gap greater than or equal to about 0.5 mm to less than or equal to about 2 mm. The discrete pieces together define the heat transfer decoration.

In one aspect, the heat transfer sheet includes at least one adhesive layer and at least one film layer disposed on a first surface of the at least one adhesive layer.

In one aspect, the defocused laser may have a spot size of greater than or equal to about 500 μm to less than or equal to about 2,000 μm, and a wattage greater than or equal to about 400 W to less than or equal to about 1000 W.

In one aspect, the method may further include disposing the discrete pieces on a carrier sheet.

In one aspect, the discrete pieces may be disposed on an adhesive surface of a carrier sheet.

In one aspect, the heat transfer sheet may include at least one carrier layer, at least one adhesive layer disposed on a first surface of the carrier layer, and at least one film layer disposed on an exposed surface of the at least one adhesive layer.

In one aspect, the at least one adhesive layer may include a first pressure-sensitive adhesive layer and a second heat-activated adhesive layer. The first pressure-sensitive adhesive layer may be disposed on the first surface of the carrier layer. The second heat-activated adhesive layer may be disposed on an exposed surface of the first pressure-sensitive adhesive layer.

In one aspect, the defocused laser may have a spot size of greater than or equal to about 500 μm to less than or equal to about 2,000 μm, and a wattage greater than or equal to about 400 W to less than or equal to about 1000 W.

In one aspect, the method may further include a further ablation of the discrete pieces to define a periphery of the heat transfer decoration.

In one aspect, a periphery of the heat transfer decoration may be discontinuous.

In one aspect, the ablating may occur with a single pass of the defocused laser.

In various other aspects, the present disclosure provides another method for forming a heat transfer decoration. The method may include disposing one or more adhesive layers on a first surface of a carrier sheet; disposing one or more film layers on an exposed surface of the one or more adhesive layers; and using a defocused laser, ablating the one or more adhesive layers and the one or more film layers so as to define at least one plurality of discrete pieces on the first surface of the carrier sheet. Each discrete piece may be separated from adjacent discrete pieces by a space greater than or equal to about 0.5 mm to less than or equal to about 2 mm. The discrete pieces together may define the heat transfer decoration.

In one aspect, the ablating may occur with a single pass of the defocused laser. The defocused laser may have a spot size of greater than or equal to about 500 μm to less than or equal to about 2,000 μm, and a wattage greater than or equal to about 400 W to less than or equal to about 1000 W.

In one aspect, the method may further include a further ablation of the discrete pieces to define a periphery of the heat transfer decoration.

In one aspect, a periphery of the heat transfer decoration may be discontinuous.

In one aspect, the one or more adhesive layers may be first adhesive layers and the first surface of the carrier sheet may include one or more second adhesive layers. The first adhesive layers may be heat-activated adhesive layers, and the second adhesive layers may be pressure-sensitive adhesive layers.

In one aspect, the method may further include contacting the heat transfer decoration with a first surface of an object and simultaneously applying heat and pressure to the carrier sheet including the plurality of discrete pieces and the first surface of the object so as to transfer the plurality of discrete pieces onto the first surface of the object. The one or more film layers may face the first surface of the object.

In one aspect, the method may further include removing the carrier sheet.

In various other aspects, the present disclosure provides a heat transfer sheet having a decoration defined therein. The heat transfer sheet includes a continuous backer having an adhesive first surface and one or more pluralities of discrete pieces disposed on the adhesive first surface of the continuous backer so as to define the decoration. Each discrete piece may include one or more adhesive layers that are disposed adjacent the adhesive first surface of the continuous backer and one or more film layers that are disposed on one or more exposed surfaces of the one or more adhesive layers. Each discrete piece may be separated from adjacent discrete pieces by a gap greater than or equal to about 0.05 mm to less than or equal to about 2 mm. The decoration may have a discontinuous periphery.

In one aspect, the continuous backer may include greater than or equal to about 0.43 discrete pieces/cm² to less than or equal to about 1.98 discrete pieces/cm²

Further areas of applicability will become apparent from the description provided herein. The description and specific examples in this summary are intended for purposes of illustration only and are not intended to limit the scope of the present disclosure.

BRIEF DESCRIPTION OF THE FIGURES

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
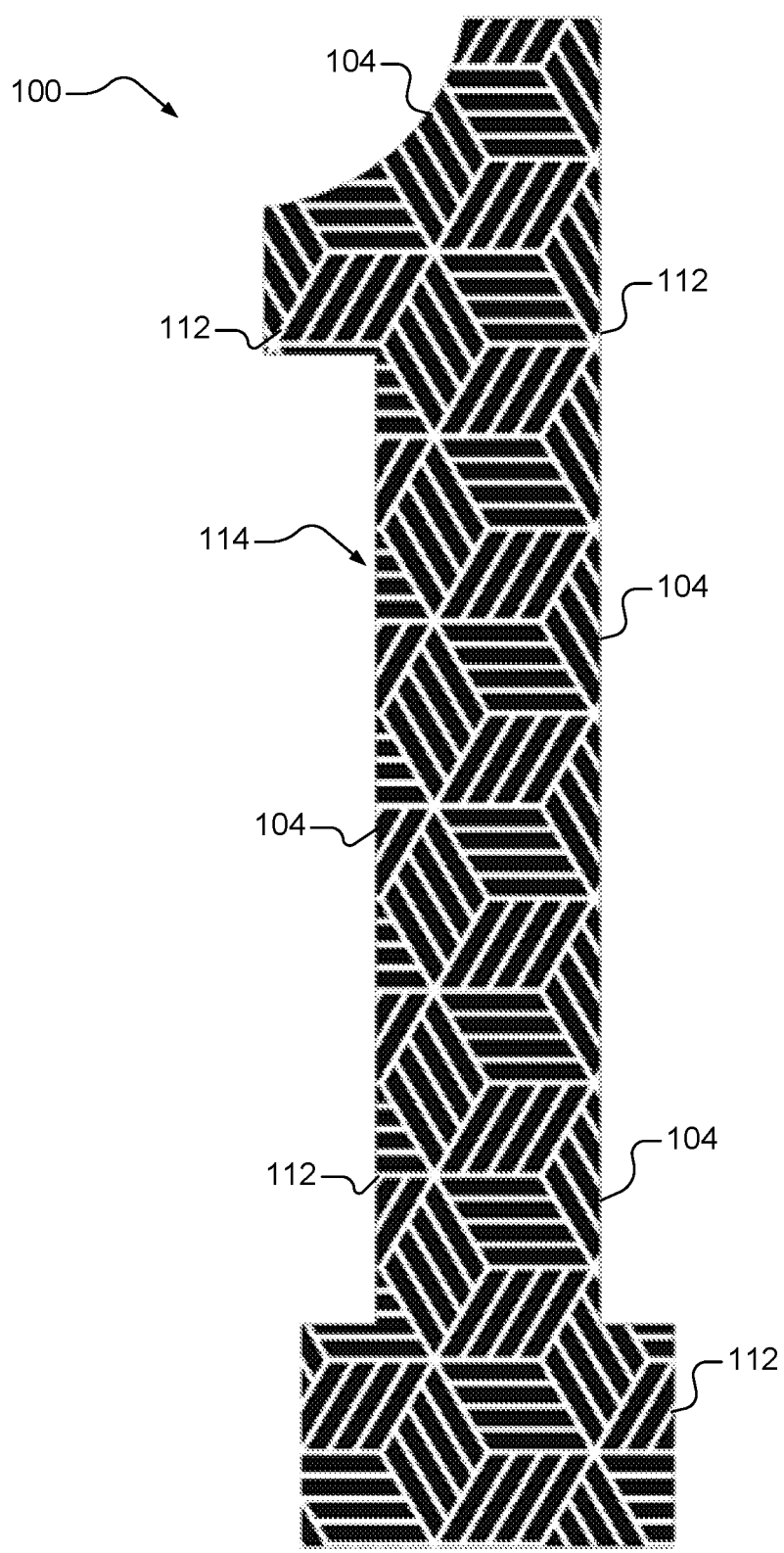
FIG. 1A is a top-down illustration of an exemplary heat transfer sheet in accordance with various aspects of the present disclosure.

Example embodiments will now be described more fully with reference to the accompanying drawings.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to", or "coupled to" another element or layer, it may be directly on, engaged, connected or coupled to the other element or layer, or intervening elements or layers may be present. In contrast, when an element is referred to as being "directly on", "directly engaged to", "directly connected to" or "directly coupled to" another element or layer, there may be no intervening elements or layers present. Other words used to describe the relationship between elements should be interpreted in a like fashion (e.g., "between" versus "directly between", "adjacent" versus "directly adjacent", etc.). As used herein, the term "and/or" includes any and all combinations of one or more of the associated listed items.

Although the terms first, second, third, etc. may be used herein to describe various elements, components, regions, layers and/or sections, these elements, components, regions, layers, and/or sections should not be limited by these terms. These terms may be only used to distinguish one element, component, region, layer, or section from another region, layer or section. Terms such as "first", "second", and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner", "outer", "beneath", "below", "lower", "above", "upper" and the like, may be used herein for ease of description to describe one element or feature's relationship to another element(s) or feature(s), as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure relates to non-cohesive designs for use on, for example, (multi-layered) transfer sheets or films, and methods of formation relating thereto. For example, the non-cohesive designs may include a plurality of distinct pieces forming one or more consecutive patterns that form shapes or objects having discontinuous peripheries. A method of forming the non-cohesive designs may include, in various aspects, ablating a transfer sheet, for example a heat transfer sheet, using a defocused laser so as to define at least one plurality of discrete pieces. The non-cohesive designs may have improved breathability and stretchability features that are particularly suited to be disposed on athletic materials, such as jerseys or sweat-wicking undergarments including, for example, performance base layer garments, as well as compression apparel and form fitting apparel.

Figure 1B:
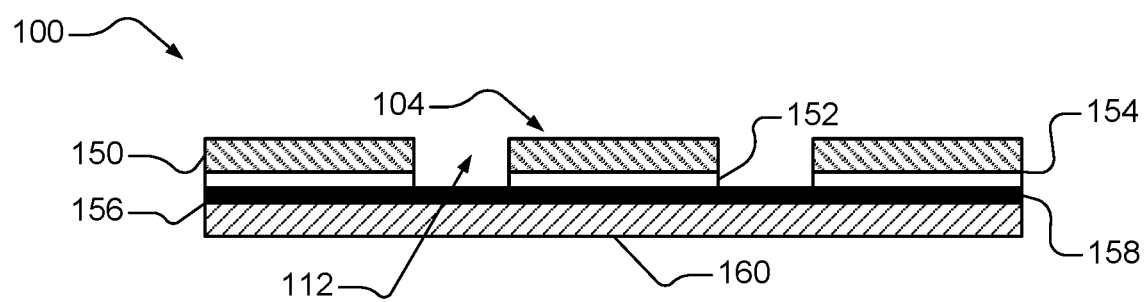
FIG. 1B is a cross-section illustration of the exemplary heat transfer sheet illustrated in FIG. 1A.

Exemplary and schematic illustrations of a heat transfer sheet 100 are shown in FIGS. 1A and 1B. For example, FIG. 1A is a top-down view of the transfer sheet 100, and FIG. 1B is a cross-section of the transfer sheet 100. The transfer sheet 100 comprises a plurality of distinct pieces 104. Each distinct piece 104 comprises, for example, one or more film layers 150 and one or more first adhesive layers 152. The film layers 150 may be disposed on or adjacent to a first exposed surface 154 of the first adhesive layers 152. The film layers 150 may each have a thickness greater than or equal to about 3 µm to less than or equal to about 5 µm. The first adhesive layers 152 may each have a thickness greater than or equal to about 1 µm to less than or equal to about 3 µm. In various aspects, the one or more film layers 150 comprise one or more ink receiving/receptive layers, for example a pigmented film layer, such as a polyurethane film layer. The one or more first adhesive layers 152 may include one or more heat-activated adhesive layers, for example, a polyester adhesive layer. The first adhesive layers 152 may be configured, upon the application or heat, to bind to an object or fabric, such as that of an athletic material.

The plurality of distinct pieces 104 are freestanding, each unconnected and non-jointed. For example, each piece 104 may be defined by an outer gap or perimeter 112 that is devoid of the film layer 150 and the adhesive layer 152. The perimeter 112 separates consecutive pieces 104, and in certain aspects, consecutive pieces 104 share the same perimeter 112. The space or interval 112 between the pieces 104 may be, for example, greater than or equal to about 0.5 mm to less than or equal to about 2 mm, optionally greater than or equal to about 0.5 mm to less than or equal to about 1 mm, optionally greater than or equal to about 0.5 mm to less than or equal to about 0.8 mm, and in certain aspects, optionally greater than or equal to about 0.6 mm to less than or equal to about 0.8 mm.

In various aspects, the distinct pieces 104 may be bound to a continuous backer or carrier sheet or layer 160 so as to define one or more designs or decorations 110. For example, one or more second adhesive layers 158 may bind the distinct pieces 104 to a carrier layer 160. As illustrated, the distinct pieces 104 may be disposed on or adjacent to a first surface 156 of the carrier layer 160. The one or more second adhesive layers 158 may be disposed between the distinct pieces 104 and the carrier layer 160. The one or more first adhesive layers 152 may interface with the one or more second adhesive layers 158. The second adhesive layers 158 may comprise, for example, a pressure-sensitive adhesive, such as viscoelastic acrylate polymer. In various aspects, the carrier layer 160 has a thickness greater than or equal to about 1 µm to less than or equal to about 127 µm, optionally greater than or equal to about 1 µm to less than or equal to about 3 µm, and in certain aspects, optionally greater than or equal to about 25.5 µm to less than or equal to about 127 µm. The second adhesive layer 158 may have a thickness greater than or equal to about 25.5 µm to less than or equal to about 127 µm.

The distinct pieces 104 may be disposed on the carrier layer 160 in one or more repeating patterns so as to define the one or more designs or decoration 110, for example, as illustrated, a number. The decoration 110 is defined by the distinct pieces 104 and as such has a discontinuous periphery 114. Though a number is depicted, the skilled artisan will appreciate that the teachings of the present disclosure may similarly apply to other designs and decorations. Likewise, the skilled artisan will appreciate that though the illustrated pieces 104 have a rectangular shape that the present disclosure may similarly apply to distinct pieces having other shapes and configurations. For example, in certain other variations, the transfer sheet 100 may comprises a plurality of first pieces having a first shape and a plurality of second pieces having a second shape that are together disposed in one or more repeating patterns so as to define one or more designs or decorations.

With renewed reference to FIGS. 1A and 1B, the carrier layer 160 comprises, for example, a polyethylene terephthalate layer having a thickness greater than or equal to about 1 µm to less than or equal to about 3 µm. The carrier layer 160 maintains the arrangement or placement of the distinct pieces 104, for example, prior to the application of the distinct pieces 104 onto a surface of an object or fabric. The distinct pieces 104 may be applied onto a surface of the object or fabric, for example an athletic material, using a heat application process. More particularly, the transfer sheet 100 may be disposed on a surface of the object or fabric and upon the application of heat and/or pressure the distinct pieces 104 may be adhered to the surface. The transfer sheet 100 may be placed onto the surface of the object or fabric such that that one or more layers 150 contact the surface. Heat and/or pressure may be applied to the transfer sheet 100 and/or the surface using any known manner so as to transfer the distinct pieces 104, including the film layer 150 and the first adhesive layers 152. For example, about 40 psi at a temperature of about 165° C. may be applied to the transfer sheet 100 and the surface of the object for a period of greater than or equal to about 8 seconds to less than or equal to about 10 seconds. In this fashion, the decoration 110, which is defined by the plurality of distinct pieces 104, is disposed on the surface of the object or fabric. The decoration 110 is non-continuous so as to maintain the flexibility and breathability of the object or fabric on which the decoration 110 is disposed. For example, in various aspects, the exposed surface of the object may include greater than or equal to about 0.43 pieces/cm$^2$ to less than or equal to about 1.98 pieces/cm$^2$.

In various aspects, the present disclosure provides a method for forming design or decoration on a transfer sheet, for example the transfer sheet 100 illustrated in FIGS. 1A and 1B. The method includes ablating a heat transfer sheet using a defocused laser to define a plurality of discrete pieces. Ablation using a defocused laser may include applying the defocused laser to the heat transfer sheet such that the laser imprints a plurality of incisions or gaps on or into the heat transfer sheet according to a predetermined design profile. For example, the defocused laser may have a spot size of greater than or equal to about 500 µm to less than or equal to about 2,000 µm, and in certain aspects, optionally about 1,000 µm. In certain variations, the wattage of the laser may be increased so that the defocused laser is able to effectively ablate the heat transfer sheet. For example, the defocused laser may have a wattage greater than or equal to about 400 W to less than or equal to about 1000 W, and in certain aspects, optionally about 500 W.

In various aspects, ablation by defocused laser occurs using known laser systems, for example modular laser systems for processing roll materials, generally including one or more of unwinders, laser diecutting stations, scraping modules, optional finishing modules, and rewinders or stackers for sheets. Such laser systems may have a cutting or imprinting speed of greater than or equal to about 10,000 mm/s to less than or equal to about 100,000 mm/s, and in certain aspects, optionally greater than or equal to about 15,000 mm/s to less than or equal to about 50,000 mm/s, and an accuracy of about ±0.15 mm (per axis).

In certain variations the transfer sheet may comprise one or more layers, for example one or more film layers and one or more adhesive layers. In such instances, ablation includes transecting the transfer sheet according to the predetermined design profile to form a plurality of discrete pieces. The method further includes, disposing the plurality of discrete pieces onto a continuous backer or carrier sheet so as to define a design or decoration. For example, the discrete pieces may be disposed on an adhesive surface of the carrier sheet. In such instances, the design or decoration is defined by the placement of the discrete pieces onto the carrier sheet. In further instances, the design or decoration may be defined by a further ablation of the backer sheet or another stamping or cutting process. The further ablation may be focused or defocused. Notably, in various aspects, focused lasers are ineffective at ablating the transfer sheet so as to define the predetermined design profile. For example, because of the limited spot size of such lasers, more than a single pass of the laser may be required.

In other variations, the transfer sheet may comprise one or more layers disposed on first surface of a backer or carrier sheet. For example, the transfer sheet may include one or more pressure-sensitive adhesive layers disposed on a first surface of the carrier sheet, one or more heat-activated adhesive layers disposed on the exposed surface of the pressure-sensitive adhesive layer, and one or more film layers disposed on the exposed surface of the heat-activated adhesive layer. In such instances, ablation includes imprinting a plurality of incisions or gaps into one or more layers of the transfer sheet to define the discrete pieces. For example, the film layer and the heat-activated adhesive layers may be ablated so as to form the plurality of discrete pieces.

The defocused laser may have a primary spot size of greater than or equal to about 500 µm to less than or equal to about 2,000 µm, and in certain aspects, optionally about 1,000 µm. Such spot size allows for the single pass definition of the plurality of discrete pieces. The design or decoration may be defined by the ablation of the one or more heat-activated adhesive layers disposed on the exposed surface of the pressure-sensitive adhesive layer (for example, the one or more first adhesive layers 152 as illustrated in FIG. 1B) and the one or more film layers disposed on the exposed surface of the heat-activated adhesive layer (for example, the one or more film layers 150 as illustrated in FIG. 1B). In such instances, the design or decoration may be further defined by a further ablation step and/or other stamping or cutting process that transects transfer sheet to define the periphery of the design or decoration. The further ablation may be focused or defocused. However, as noted above, focused lasers may be ineffective at ablating the transfer sheet so as to define the predetermined design profile. For example, because of the limited spot size of such lasers, more than a single pass of the laser may be required.

In various aspects, the method may further include disposing backer sheet including the plurality of discrete pieces onto a first surface of an object or fabric, for example an athletic material. For example, the carrier sheet may be disposed so that the one or more film layers disposed on the exposed surface of the heat-activated adhesive layer (for example, the one or more film layers 150 as illustrated in FIG. 1B) interface with the first surface of the object or fabric. As detailed above, heat and pressure may be simultaneously applied to the carrier sheet, including the plurality of discrete pieces and the first surface of the object, so as to transfer the plurality of discrete pieces onto the first surface of the object. In certain variations, the method may include removing the backer sheet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a heat transfer decoration, the method comprising:
    ablating a heat transfer sheet using a defocused laser to define at least one plurality of discrete pieces, wherein each discrete piece is separated from adjacent discrete pieces by a gap greater than or equal to about 0.5 mm to less than or equal to about 2 mm, and wherein the discrete pieces together define the heat transfer decoration, and
    ablating the discrete pieces to define a periphery of the heat transfer decoration.

2. The method of claim 1, wherein the heat transfer sheet comprises at least one adhesive layer and at least one film layer disposed on a first surface of the at least one adhesive layer.

3. The method of claim 2, wherein the defocused laser has a spot size of greater than or equal to about 500 µm to less than or equal to about 2,000 µm, and a wattage greater than or equal to about 400 W to less than or equal to about 1000 W.

4. The method of claim 2, wherein the method further includes disposing the discrete pieces on a carrier sheet.

5. The method of claim 4, wherein the discrete pieces are disposed on an adhesive surface of the carrier sheet.

6. The method of claim 1, wherein the heat transfer sheet comprises at least one carrier layer, at least one adhesive layer disposed on a first surface of the carrier layer, and at least one film layer disposed on an exposed surface of the at least on adhesive layer.

7. The method of claim 6, wherein the at least one adhesive layer includes a first pressure-sensitive adhesive layer and a second heat-activated adhesive layer, wherein the first pressure-sensitive adhesive layer is disposed on the first surface of the carrier layer and the second heat-activated adhesive layer is disposed on an exposed surface of the first pressure-sensitive adhesive layer.

8. The method of claim 6, wherein the defocused laser has a spot size of greater than or equal to about 500 µm to less than or equal to about 2,000 μm, and a wattage greater than or equal to about 400 W to less than or equal to about 1000 W.

9. The method of claim 1, wherein a periphery of the heat transfer decoration is discontinuous.

10. The method of claim 1, wherein the ablating occurs with a single pass of the defocused laser.

11. A method for forming a heat transfer decoration, the method comprising:
disposing one or more adhesive layers on a first surface of a carrier sheet;
disposing one or more film layers on an exposed surface of the one or more adhesive layers; and
using a defocused laser, ablating the one or more adhesive layers and the one or more film layers so as to define at least one plurality of discrete pieces on the first surface of the carrier sheet, wherein each discrete piece is separated from adjacent discrete pieces by a space greater than or equal to about 0.5 mm to less than or equal to about 2 mm, wherein the discrete pieces together define the heat transfer decoration, and wherein the ablating occurs with a single pass of the defocused laser, the defocused laser having a spot size of greater than or equal to about 500 μm to less than or equal to about 2,000 μm and a wattage greater than or equal to about 400 W to less than or equal to about 1000 W.

12. The method of claim 11, wherein the method further includes a further ablation of the discrete pieces to define a periphery of the heat transfer decoration.

13. The method of claim 11, wherein a periphery of the heat transfer decoration is discontinuous.

14. The method of claim 11, wherein the one or more adhesive layers are first adhesive layers and the first surface of the carrier sheet includes one or more second adhesive layers, wherein the first adhesive layers are heat-activated adhesive layers and the second adhesive layers are pressure-sensitive adhesive layers.

15. The method of claim 11, wherein the method further includes:
contacting the heat transfer decoration with a first surface of an object, wherein the one or more film layers face the first surface of the object; and
applying simultaneously heat and pressure to the carrier sheet, including the plurality of discrete pieces and the first surface of the object, so as to transfer the plurality of discrete pieces onto the first surface of the object.

16. The method of claim 15, wherein the method further includes removing the carrier sheet.

17. A heat transfer sheet having a decoration defined therein, wherein the heat transfer sheet comprises:
a continuous backer having an adhesive first surface; and
one or more pluralities of discrete pieces disposed on the adhesive first surface of the continuous backer so as to define the decoration, wherein each discrete piece comprises one or more adhesive layers that are disposed adjacent to the adhesive first surface of the continuous backer and one or more film layers that are disposed on one or more exposed surfaces of the one or more adhesive layers, wherein each discrete piece is separated from adjacent discrete pieces by a gap greater than or equal to about 0.05 mm to less than or equal to about 2 mm, and wherein the decoration has a discontinuous periphery.

18. The heat transfer sheet of claim 17, wherein the continuous backer includes greater than or equal to about 0.43 discrete pieces/cm$^2$ to less than or equal to about 1.98 discrete pieces/cm$^2$.

* * * * *